E. Warren,
Blacksmiths' Clinchers.
No. 40,522. Patented Nov. 3, 1863.
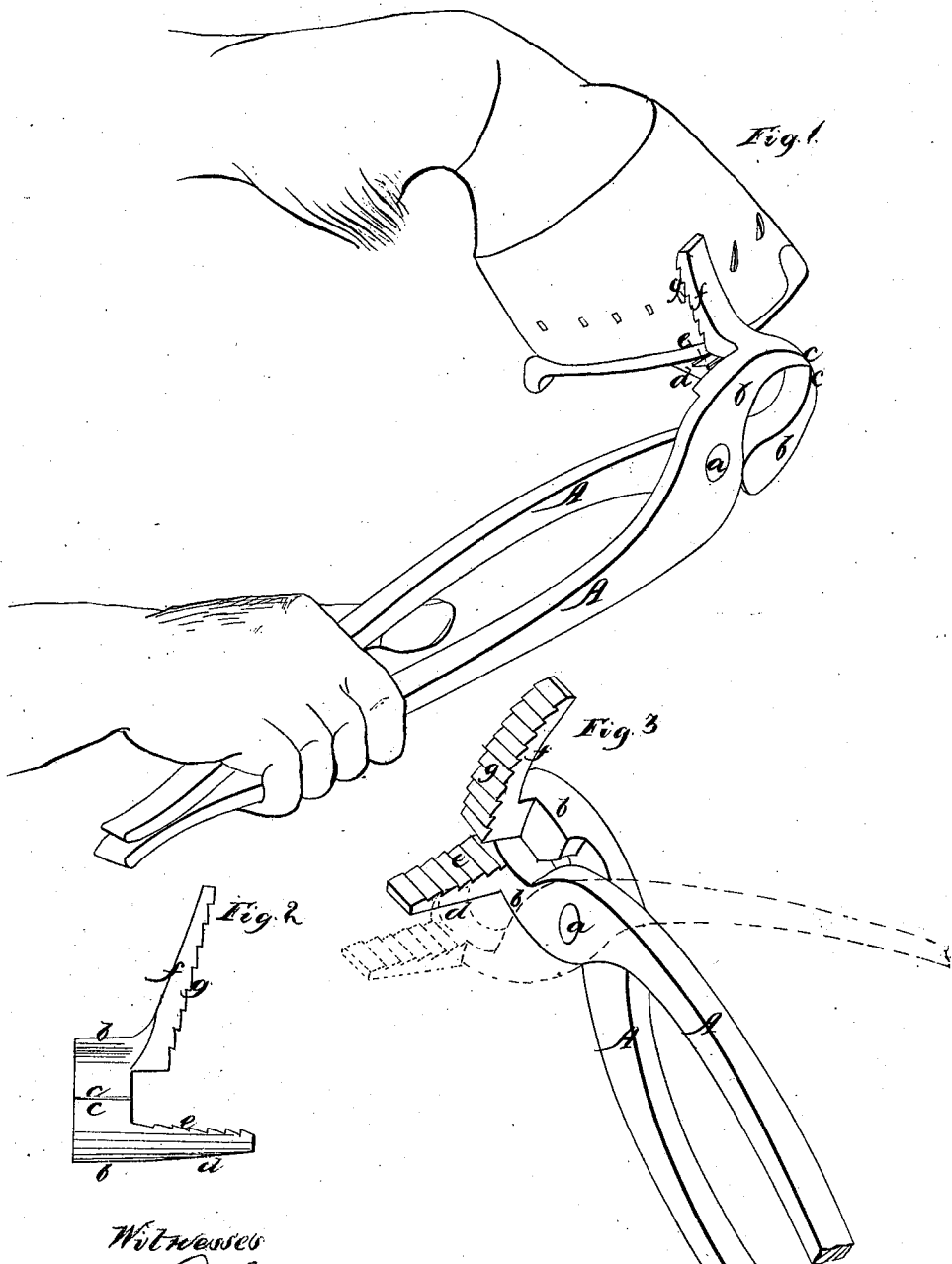

UNITED STATES PATENT OFFICE.

E. WARREN, OF MARSHALL, MICHIGAN.

IMPROVED CLINCHING AND NIPPING TOOL.

Specification forming part of Letters Patent No. 40,522, dated November 3, 1863.

*To all whom it may concern:*

Be it known that I, E. WARREN, of Marshall, in the county of Calhoun and State of Michigan, have invented a new and useful Combination of a Clinching-Tool and Nippers for Clinching and Nipping Horseshoe-Nails; and I do hereby declare that the following is a full, clear, and exact description of the same, reference being had to the accompanying drawings, making a part of this specification, in which—

Figure 1 is a perspective view of my invention applied to its work; Fig. 2, an end view of the same; Fig. 3, a detached perspective view of the same.

Similar letters of reference indicate corresponding parts in the several figures.

This invention consists in a combination of a clinching-tool and nippers so constructed and arranged that the horseshoe-nails may, when a shoe is applied, be clinched on the hoof of the horse without the aid of a hammer.

To enable those skilled in the art to fully understand and construct my invention I will proceed to describe it.

A A represent the two handles or levers of the implement, which cross each other and are connected by a rivet, *a*, as shown clearly in Figs. 1 and 3. The short parts or arms *b b'* of the levers are swaged, forged, or otherwise formed to make cutting-edges *c c*, precisely like those of ordinary nippers, as will be seen by referring to Figs. 1 and 2. One of the arms *b* has a projection, *d*, which extends from it at right angles, the upper surface of which is notched or serrated, as shown at *e*, and the other arm, *b'*, has a projection, *f*, which extends upward, and is slightly curved on its face side, and also notched or serrated, as shown at *g*. The projection *f* is in line with the projection *d*, both projections being on the same side of the tool, and being nearly at a right angle with each other. The nippers *c c*, projections *d f*, and arms *b b'* should be of steel and nicely tempered. The long arms which form the handles proper may be of wrought or malleable cast-iron.

The tool or implement is used as follows: In nipping off nails from the hoof the nippers are applied and used in the usual way. In clinching the nails the projection *d* is placed under the nail-head, and the handles or levers distended or forced apart, so that the projection *f* will act upon the end of the nail that projects through the hoof. The levers are then forced toward each other, and the serrated face of the projection *f* will draw down and clinch the nail. This will be fully understood by referring to Fig. 1. The serrated face of the projection *d* prevents the latter from slipping underneath the nail-head.

By means of this tool the shoeing of horses, especially those vicious or uneasy, is greatly expedited and the work performed in a perfect manner.

I would remark that a spring may, if desired, be placed between the levers A A, in order to distend them or force them apart.

Having thus described my invention, what I claim as new, and desire to secure by Letters Patent, is—

The combination of the nippers *c c* and projections *d f* on the short arms *b b'*, of the pivoted crossed levers A A, substantially as shown and described, to form a combined clinching-tool and nippers, for the purpose herein set forth.

E. WARREN.

Witnesses:
E. H. LAWRENCE,
H. D. STANHOPE.